3,306,728
SLOW RELEASE FERTILIZER COMPRISING UREA AND PETROLEUM WAXES, AND METHOD OF MAKING
Robert H. Campbell, Brookhaven, Del., and Herbert L. Johnson, Media, Pa., assignors to Sun Oil Company, Philadelphia, Pa., a corporation of New Jersey
No Drawing. Filed Apr. 17, 1964, Ser. No. 360,728
10 Claims. (Cl. 71—28)

This application is a continuation-in-part of application Serial No. 308,097, filed September 11, 1963, and now abandoned.

This invention relates in one aspect to a method of forming a stable dispersion of urea in molten paraffin wax. The dispersion is stable in that the urea and molten paraffin wax components thereof do not react to form an adduct. This reaction is prevented, and stability thus imparted to the dispersion, by incorporating a small amount of microcrystalline wax in the paraffin wax. The stable dispersion is useful in that a slow release urea fertilizer can be made therefrom.

The invention relates in another aspect to slow release fertilizer compositions which comprise a dispersion of solid urea in solid wax. The wax phase of said dispersion is predominantly low melt point paraffin wax but also contains a relatively small amount of either microcrystalline wax or high melt point paraffin wax. The purpose of the microcrystalline wax and the high melt point paraffin wax is to prevent the solid urea and the solid low melt point paraffin wax from reacting with each other to form an adduct, a reaction which will occur during storage of the fertilizer and which results in a change in the water resistance of the composition. Hence in this aspect the invention is slow release urea-wax fertilizer compositions having improved storage stability.

Nitrogen, potassium, and phosphorus are essential elements for plant growth and commercially available fertilizers invariably contain one or more of these elements. Examples of those in frequent use at the present time include urea, ammonium nitrate, potassium chloride, sodium nitrate, potassium phosphate, monoammonium phosphate, diammonium phosphate, potassium sulfate, calcium cyanamide, potassium nitrate, superphosphate (a mixture of calcium acid phosphate and calcium sulfate), and triple superphosphate (calcium acid phosphate). Urea is a preferred source of nitrogen because it contains a higher percentage of nitrogen than the other nitrogen fertilizer compounds mentioned.

The number of fertilizer compounds applied to the soil at a given time depends mainly upon the soil analysis and the crops to be grown. In some cases only nitrogen is needed, hence only a nitrogen fertilizer is applied. In the majority of cases, however, all three of the essential elements are needed and in such cases the fertilizer actually applied to the soil is a blend of nitrogen fertilizer, a potassium fertilizer, and a phosphorus fertilizer. Some compounds such as diammonium phosphate contain more than one essential element. A fertilizer containing all three essential elements is conventionally referred to as a complete fertilizer. It is also conventional to state the amount of each essential element in the complete fertilizer by a series of numbers which refer, in order, to the weight percentage of nitrogen (as N), phosphorus (as $P_2O_5$), and potassium (as $K_2O$) in the fertilizer. For example a 20–10–5 fertilizer contains 20% nitrogen, 10% phosphorus, and 5% potassium by weight. Fertilizers lacking an essential element are also described by this system but by conventional terminology they are not complete fertilizers. Thus a 10–0–10 fertilizer contains 10% nitrogen, no phosphorus, and 10% potassium. In addition to the above, most conventional fertilizers, whether complete or otherwise, contain some inert material in order to maintain the percentage of the essential elements present in the fertilizer at a relatively low level in an attempt to avoid excessive local concentrations of, say, nitrogen in the soil which may result in "burned" crops.

Unfortunately most of the commercial fertilizers mentioned previously are readily water soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather than benefit. This is often noticed in "burned" lawns or crops.

One method of reducing the rate at which the fertilizer is consumed is to mix the fertilizer and molten wax, i.e., disperse the fertilizer in molten wax, form the dispersion into small particles in a mold and allow the particles to cool below the melting point of wax. The resulting particles are a dispersion of solid fertilizer particles in solid wax. Substantially all the particles of solid urea are surrounded by and encased in solid wax. They can also be described as a slow release fertilizer. The water resistance of the fertilizer can be varied, by varying the amount of wax in the dispersion so as to provide the proper rate of release of essential elements for the particular climatic conditions encountered. In areas of relatively heavy rainfall the water resistance of the fertilizer should normally be relatively high and the amount of wax in the dispersion should be relatively high. Conversely, in relatively dry areas the water resistance should be relatively low and the amount of wax in the dispersion should be relatively low.

It was mentioned previously that urea is a preferred source of nitrogen since it contains a relatively high (47%) amount of nitrogen. This feature of urea becomes especially valuable when a slow release fertilizer is prepared in the manner described above. The wax portion of the slow release fertilizer contributes no nitrogen, potassium, or phosphorus. Furthermore, the wax reduces the proportion of actual fertilizer materials in the slow release fertilizer. This being the case it becomes necessary to use fertilizer ingredients having a high content of essential elements. For this reason most slow release fertilizers will contain urea as a source of nitrogen. The actual urea content of the slow release fertilizer will vary rather widely depending upon the particular type of fertilizer. A slow release nitrogen fertilizer will normally contain a major amount of urea, i.e., more than 50%, and a minor amount, i.e., less than 50% of wax. Usually the amount of urea will be 50–80%, more frequently 50–70%, and the amount of wax will be 15–49%, more frequently 25–49%, the exact amounts depending upon climatic conditions as described above. All percentages and parts herein are by weight.

In the case of a slow release fertilizer containing a plurality of essential elements the total amount of fertilizer ingredients and the amount of wax will still normally be a major amount and a minor amount respectively, usually 50–80%, and 15–49% respectively, more frequently 50–70% and 25–49% respectively, but the actual amount of urea may in some cases be relatively small. For example, a 10–10–10 complete slow release fertilizer might contain the following:

| | Percent |
|---|---|
| Urea | 21.4 |
| Triple superphosphate | 21.8 |
| Potassium chloride | 16.7 |
| Wax | 40.1 |
| | 100.0 |

A 5–15–10 complete slow release fertilizer might contain

| | Percent |
|---|---|
| Urea | 10.7 |
| Triple superphosphate | 32.6 |
| Potassium sulfate | 18.5 |
| Wax | 38.2 |
| | 100.0 |

In most cases the amount of urea will not be less than 5%. Usually it will be at least 10%, more frequently 20%. Therefore, considering both the case where the urea is the only fertilizer ingredient and the case where urea is one of a plurality of fertilizer ingredients, the amount of urea will usually be 5–80% urea, more frequently 20–70% and the amount of wax will usually be 15–49%, more frequently 25–49%.

Although several different kinds of waxes can be used to prepare a slow release fertilizer paraffin wax is often preferred because of its generally lower cost. Within paraffin waxes themselves, the low melt point paraffin waxes are generally preferred because they are usually not only less costly but also more readily available. However, when slow release fertilizers comprising a dispersion of solid urea in solid paraffin wax are prepared two difficulties are encountered. One problem arises in the preparation of such a composition and, moreover, arises regardless of the type of paraffin wax used. This problem is a processing problem. The second difficulty is a disadvantage of the composition itself and arises when the wax used is a low melt point paraffin wax. These difficulties, and the solutions provided therefor by our invention, are described in detail separately as follows.

The processing problem arises when urea is dispersed in molten paraffin wax preparatory to forming slow release fertilizer particles. When the urea and molten paraffin wax are initially mixed nothing unusual occurs. The mixture is fluid, i.e., it takes the shape of its container, and it has the usual appearance and texture of a mixture of a solid and a liquid. Shortly after mixing, however, a white precipitate forms. If the ratio of urea to molten paraffin wax is greater than 1:1 the entire mass becomes a granular solid having about the texture of wet sand. In this case it is difficult to even remove the material from the mixing vessel. The solid precipitate is not merely a physical mixture of wax and urea because when it is heated to 210° F. the wax component thereof, which has a melting point of 129° F., does not melt. Analysis of the precipitate indicates that it contains a substantial amount of a urea-paraffin wax adduct having a composition of about 76% urea-24% paraffin wax.

This reaction between the urea and molten paraffin wax to form an adduct is substantially independent of the particular type of paraffin wax employed. Thus it will occur not only with low melt point paraffin waxes but also with high melt point paraffin waxes. Although the melting point of the paraffin wax may have some effect on the rate of the adduction reaction, as described below, it does not have any effect on the fact of adduction.

The time required for adduction, i.e., for the formation of the precipitate, varies somewhat but appears to depend mainly upon urea particle size and, to a much lesser extent, on the melting point of the paraffin wax. When commercial crystal urea, which has a particle size of mainly larger than 100 mesh (all mesh sizes are by U.S. Standard Sieves) is dispersed in a paraffin wax having a melting point of 129° F., adduction generally occurs in less than 15 minutes. When urea having a particle size of smaller than 200 mesh is used adduction generally occurs in less than five minutes. When higher melt point paraffin waxes are used the time required for adduction is sometimes very slightly, almost negligibly, longer. In any event the adduction reaction often occurs before the dispersion can be shaped into small particles.

The solid adduct itself has some slow release properties and has been disclosed and claimed in a copending application Serial No. 308,087, filed September 11, 1963. In fact, the adduct has a higher water resistance than a dispersion of solid urea in solid wax containing the same total amounts of urea and wax but in which the urea is in the unadducted form. The adduct has a disadvantage, however, in that its water resistance sometimes decreases rapidly after prolonged contact with water. This phenomenon is unpredictable in that some batches of adduct exhibit it while other batches, apparently identical, do not. Because of this erratic behavior it is often preferable that the slow release fertilizer be a dispersion of solid urea in solid paraffin wax rather than a urea-paraffin wax adduct. Where such is the case a method of preventing or at least postponing the adduction reaction is necessary in order that it does not occur during the time the dispersion is being processed into small particles. We have now found such a method.

According to the method embodiment of the invention adduction of a urea-molten paraffin wax mixture is prevented, or at least substantially delayed, by incorporating a small amount of molten microcrystalline wax in the molten paraffin wax. Such incorporation permits the preparation of a stable dispersion of urea in molten paraffin wax. The dispersion is described as stable in that the urea and molten paraffin wax components thereof do not react to form an adduct. The stable dispersion can be formed into fertilizer particles without difficulty in any convenient manner such as by the use of a mold as already described.

The terms paraffin wax and microcrystalline wax are used herein in accordance with their conventional meanings. Both types of waxes are obtained only from petroleum. Moreover, they are only waxes obtainable from petroleum. Their differences and similarities are well known to those skilled in the art and are summarized in Bennett, Commercial Waxes, Chemical Publishing Co. (1950), pp. 84–88. Both paraffin and microcrystalline waxes contain mainly saturated paraffin hydrocarbons, the former containing mainly straight chain paraffins while the latter contains a substantial amount of branch chain paraffins. Some typical properties of paraffin and microcrystalline waxes are shown in Table I below.

TABLE I

| Property | Paraffin Wax | Microcrystalline Wax |
|---|---|---|
| Molecular Weight | 250–500 | 500–800 |
| Melting Point (ASTM D–127), °F | 110–165 | 140–210 |
| Viscosity at 210° F. (ASTM D–446), S.U.S. | 30–50 | 60–100 |
| Penetration at 77° F. (ASTM D–1321, 100 g., 5 sec.) dmm | 5–25 | 5–25 |

It is apparent from the data in Table I that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous.

The amount of microcrystalline wax which should be incorporated into molten paraffin wax to prevent adduction of the latter when urea is mixed therewith is 0.1% by weight of the paraffin wax. Preferably the amount of microcrystalline wax is at least 1%, more preferably 3%. Although the amount of microcrystalline wax can be as high as 100% by weight of the paraffin wax, in which case the resulting wax mixture will contain 50% of each wax, preferably the amount used is not greater than 30%, more preferably 10%. In all cases, of course, the amount used should be a stabilizing amount, i.e., an amount which prevents adduction for as long a period as is required to form the dispersion into small particles.

The embodiment of the invention described above is applicable to the dispersion of any amount of urea in paraffin wax. However, since such a dispersion will generally be used to form slow release fertilizer particles, the relative amounts of urea and wax will be within the ranges specified previously. The amount of urea will usually be 5-80 parts, more frequently 20-70 parts, and the total amount of wax, i.e., the paraffin wax plus the microcrystalline wax, will be 15-49 parts, more frequently 25-49 parts. Of the total amount of wax the microcrystalline wax will be a stabilizing amount, at least 0.1% by weight of the paraffin wax.

As previously described, the method embodiment of the invention described above is applicable to the dispersion of urea in any kind of molten paraffin wax, e.g., high melt, low melt, hard, soft, etc., paraffin wax, inasmuch as any kind of paraffin wax forms an adduct with urea. This is brought out more clearly by the examples hereinafter. Similarly any kind of microcrystalline wax can be used to prevent adduction of the urea and paraffin wax. In most cases, and preferably, the paraffin and microcrystalline waxes will have physical properties as listed in Table I. More preferably the microcrystalline wax has a melting point in the range of 160° F. to 210° F. and a penetration in the range of 5-15 dmm. All wax properties stated herein are by the appropriate ASTM Tests indicated in Table I.

The stable dispersion is formed according to the invention by mixing urea, and other fertilizer compounds as the case may be, with molten paraffin wax and molten microcrystalline wax, the amount of microcrystalline wax being as already specified. The order in which the three ingredients are mixed is not critical so long as certain precautions are observed. One scheme involves heating a mixture of paraffin and microcrystalline wax to a temperature above the melting points of the waxes. The urea is then added to and dispersed in the molten wax mixture. If other fertilizer ingredients are to be included they are also added and dispersed in the molten wax. This is the preferred method. Alternatively the urea can be dispersed in the molten paraffin wax after which molten microcrystalline wax is mixed with the dispersion. This method is less preferable since the urea may and often does react with the paraffin wax to form an adduct before the microcrystalline wax is incorporated. Care must therefore be exercised to incorporate the microcrystalline wax prior to the time the adduct reaction occurs. This problem is obviated by premixing the two waxes and then mixing the urea with the resulting molten wax mixture.

*Examples I–XIII*

The data contained in Table III show the benefits which can be obtained by utilizing the method of the invention. More specifically the data show the time required for adduction to occur in a dispersion of urea in molten paraffin wax alone and in a dispersion of urea in a molten mixture of paraffin and microcrystalline wax, this time being referred to as the adduction time. Adduction is evidenced by conversion of the fluid dispersion into a solid mass. Times marked with an asterisk mean that adduction did not occur within the stated time in which case therefore either adduction would not occur or the adduction time is greater than the stated time. In each case the stated amount of paraffin wax is first heated to 200° F. Where microcrystalline wax is also used it is then added to the molten paraffin wax and the mixture stirred until the microcrystalline wax is also molten. Commercial crystal urea in the amount stated is then charged to the molten wax mixture and the mass is stirred until either the dispersion of urea in molten wax becomes solid or a prolonged period of time has elapsed without solidification of the dispersion. The waxes shown in Table III are identified by type, i.e., either paraffin or microcrystalline, and also by a letter, the letter enabling the physical properties of the waxes to be determined by reference to Table II below.

TABLE II

| Wax and Type | Melting Point, °F. | Penetration at 77° F. (dmm.) | Viscosity at 210° F. (SUS) |
|---|---|---|---|
| A—Paraffin | 129 | 18 | 38.8 |
| B—Paraffin | 145 | 9 | 40.0 |
| C—Paraffin | 156 | 9 | 44.8 |
| D—Microcrystalline | 151 | 21 | 72.0 |
| E—Microcrystalline | 178 | 10 | 69.0 |
| F—Microcrystalline | 193 | 5 | 84.0 |

TABLE III

| Run | Amount Urea, Parts | Paraffin Wax Type | Paraffin Wax Amt., Parts | Microcrystalline Wax Type | Microcrystalline Wax Amt., Parts | Amt. as Percent of Paraffin Wax | Adduction Time |
|---|---|---|---|---|---|---|---|
| 1 | 70 | A | 30.0 | None | | | 8 min. |
| 2 | 70 | A | 28.5 | F | 1.5 | 5.3 | 2 hrs.* |
| 3 | 70 | A | 29.4 | E | 0.6 | 2.0 | 2 hrs.* |
| 4 | 60 | B | 40.0 | None | | | 8 min. |
| 5 | 60 | B | 33.0 | F | 7.0 | 21.2 | 1 hr.* |
| 6 | 60 | B | 39.6 | D | 0.4 | 1.0 | 1 hr.* |
| 7 | 60 | B | 39.2 | E | 0.8 | 2.0 | 1.5 hrs.* |
| 8 | 60 | C | 40.0 | None | | | 12 min. |
| 9 | 60 | C | 39.2 | E | 0.8 | 2.0 | 1 hr.* |
| 10 | 55 | A | 45.0 | None | | | 8 min. |
| 11 | 55 | A | 42.7 | D | 2.3 | 5.4 | 2 hrs.* |
| 12 | 55 | C | 45.0 | None | | | 9 min. |
| 13 | 55 | C | 44.5 | F | 0.5 | 1.1 | 1 hr.* |

It is apparent from the above data that a stable dispersion of urea in molten paraffin wax can be obtained by incorporating microcrystalline wax in the paraffin wax as previously described.

It was mentioned previously that another aspect of the invention relates to fertilizer compositions comprising a dispersion of solid urea in low melt point paraffin wax. The problem involved with these compositions is best described in conjunction with the prior art as follows. It is known that a dispersion of solid urea in low melt point paraffin wax is a slow release fertilizer. Furthermore, it is known that in dispersing solid urea in molten low melt point paraffin wax, preparatory to forming discrete slow release fertilizer particles, it is desirable to include an adduct inhibitor in the wax to prevent or delay the adduction reaction which would otherwise occur between the urea and wax. Several adduct inhibitors are known and include rosin; wax soluble polymers having a molecular weight of at least 400, preferably at least 2000, the polymers being vinyl polymers, condensation polymers, or polymers of olefin oxides containing 2–3 carbon atoms; fatty acid triglycerides; naphthenic acids; fatty acid amines, amides, and nitriles; long-chain polyalkylaromatics; saturated and unsaturated fatty acids such as stearic and oleic acids; trialkanolamines; and the like. Of these rosin is the preferred inhibitor. The solid fertilizer particles which ultimately result when an adduct inhibitor such as those just described is used are a dispersion of solid urea in solid low melt point paraffin wax, the wax having the inhibitor dissolved therein. Unfortunately when such particles are placed in storage for 1–2 months it is found that the water resistance of the particles changes during storage. Usually the water resistance decreases. Most of this change has been found to be due to reaction between the solid urea and solid low melt point paraffin wax to form an adduct. This means that even though certain materials are effective in preventing or delaying adduction between urea and molten low melt point paraffin wax, i.e., during the preparation of the fertilizer, adduction in the solid particles can nevertheless occur, albeit at a much slower rate.

It has now been found that if certain other types of wax are incorporated into the low melt point paraffin wax to yield a homogeneous wax mixture, the change in water resistance during storage of the urea fertilizer particles ultimately prepared therefrom is substantially reduced. The other waxes which can be used to achieve this beneficial result are microcrystalline wax, high melt point paraffin wax, and mixtures thereof. In other words fertilizer particles comprising solid urea dispersed in a solid homogeneous mixture of either (1) low melt point paraffin wax and high melt point paraffin wax, (2) low melt point paraffin wax and microcrystalline wax, or (3) low melt point paraffin wax, microcrystalline wax, and high melt point paraffin wax have more storage stability than particles comprising solid urea dispersed in solid low melt point paraffin wax alone.

In order to facilitate the subsequent description the change in water resistance during storage of solid fertilizer particles will be referred to as storage stability. This change will not be referred to as adduction even though this is the theoretical explanation therefor. The term adduction will be used only to refer to the adduction reaction which occurs between urea and molten paraffin wax.

As used herein a low melt point parafin wax is a paraffin wax having a melting point in the range of 110° to 140° F. Preferably the melting point is in the range of 120° to 135° F. Usually such a wax will have a penetration at 77° F. in the range of 5 to 25 dmm. although preferably the penetration is 10–25. A high melt point paraffin wax is a paraffin wax having a melting point of at least 145° F. Normally the melting point is in the range of 145°–165° F. and preferably it is in the range of 150°–165° F. A high melt point paraffin wax will normally have a penetration at 77° F. in the range of 5–15 dmm. Microcrystalline wax has been adequately defined hereinbefore. It will usually have a melting point of 140° to 210° F. Preferably for the present purpose the melting point is 160°–210° F. The penetration of microcrystalline wax will usually be and preferably is in the range of 5–25 dmm.

In the subsequent discussion low melt point paraffin wax as defined above is referred to as Wax I. Microcrystalline wax, high melt point paraffin wax, and mixtures of these latter two are referred to hereinafter as Wax II.

The amount of Wax II which is incorporated into Wax I in order to substantially improve the storage stability of the ultimate fertilizer particles should be such that the amount of Wax II is 10–50% of the total amount of Wax I and Wax II. Preferably Wax II is 15–40% of the total amount of Wax I and Wax II.

The fertilizer compositions of the invention, which comprise solid urea dispersed in a solid, homogeneous mixture of Wax I and Wax II, can be prepared in any suitable manner. For example, Wax I is heated to above its melting point. Wax II is then added to the molten Wax I and the mixture is then stirred until Wax II melts and is uniformly mixed with Wax I. If Wax II is a high melt point paraffin wax it will be desirable to incorporate an adduct inhibitor in the molten wax mixture prior to dispersing urea therein in order to prevent adduction of the urea. Any suitable inhibitor such as those known inhibitors described previously can be used. After incorporating the inhibitor in the molten wax mixture the urea is then added and the resulting mixture is stirred until the urea is uniformly dispersed in the molten wax mixture. The uniform dispersion is then shaped into fertilizer size particles in any suitable manner such as by means of a mold and the resulting particles are allowed to cool to effect solidification of the wax.

If Wax II is microcrystalline wax the procedure can be the same as that described above except that it is not necessary to incorporate a separate adduct inhibitor in the molten wax mixture prior to incorporation therein of the urea. The reason for this is that the amount of microcrystalline wax necessary to achieve storage stability (at least 10%) is also sufficient to prevent adduction of urea and molten paraffin wax. This is, of course, the aspect of the invention described initially. Therefore, after forming a molten mixture of Wax I and microcrystalline wax the urea is uniformly dispersed therein and the resulting dispersion is formed into solid fertilizer particles.

It may also be desirable in some cases, for reasons not heretofore discussed, to incorporate certain other additives in the wax phase of the slow release fertilizer. In copending application Serial No. 308,251, filed September 11, 1963, now U.S. Patent No. 3,252,786, two additives, rosin and asphalt, are disclosed which when dissolved in the wax component of a slow release fertilizer comprising a dispersion of urea in wax improve the properties thereof. The incorporation of either of these additives in our present compositions is a preferred embodiment thereof. The rosin, which can be wood, gum or tall oil rosin, and which can be unmodified rosin or any of the various rosin derivatives such as polymerized rosin, hydrogenated rosin, rosin esters, metal salts of rosin, etc. serves as an adduct inhibitor and also improves the water resistance of the fertilizer.

The other additive disclosed in application 308,251 is asphalt. If rosin is present in the wax, asphalt effects a further improvement in the water resistance of the resulting fertilizer. Regardless of whether rosin is present or not, the asphalt renders the dispersion of urea in molten wax substantially more fluid than it is without the asphalt. When small size, say through 200 mesh, urea particles or any other fertilizer particles, are dispersed in wax the resulting dispersion is very viscous, having a putty-like consistency. However, if asphalt is present in the wax when the dispersion is formed, the subsequent dispersion is very fluid, having about the fluidity of paint or melted chocolate.

The amount of rosin normally employed will be a minor amount, i.e., less than 50%, based on the total weight of wax and rosin if asphalt is absent, or based on the total weight of wax, rosin, and asphalt where the latter is also used. Preferably the amount of rosin is 2–35%, more preferably 3–20%. All percentages and parts herein are by weight. Where asphalt is used to fluidize a dispersion of urea in wax it should be used in amount of 1–20%, preferably 3–10%, by weight of the wax. Where asphalt is incorporated into the wax to improve the fertilizer water resistance, in which case rosin will also be present, the amount of asphalt should be a minor amount, based on the total weight of wax, rosin, and asphalt, effective to improve the fertilizer water resistance, preferably 0.25–40.0%, more preferably 3–20%.

From the above description it is apparent that from one standpoint microcrystalline wax is the preferred Wax II because it serves a dual function. It inhibits adduction of urea and molten paraffin wax and it also improves the storage stability of the ultimate fertilizer particles. High melt point paraffin wax achieves only the latter result. On the other hand high melt point paraffin wax is preferred in some cases because it is usually cheaper than microcrystalline wax. In other words, it may be more economical in some cases to use high melt point paraffin wax as the storage stabilizer, i.e., as Wax II, plus another additive such as rosin to inhibit adduction of the urea and molten paraffin wax rather than using microcrystalline wax for both purposes. This is especially true in the case of an additive such as rosin which performs other valuable functions, e.g., water resistance improvement, unrelated to adduction or storage stability.

The following examples illustrate the improved storage stability of a urea-low melt point paraffin wax fertilizer which can be achieved by incorporating in the low melt point paraffin wax a microcrystalline wax or a high melt point paraffin wax.

*Example XIV*

Into a vessel equipped with heating and agitation means is charged 36 parts of a paraffin wax having a melting point of 129° F., a penetration at 77° F. of 18 dmm. and a viscosity at 210° F. of 38 S.U.S. This wax is a low melt point paraffin wax as defined herein. The wax is heated to 240° F. after which 2 parts wood rosin and 2 parts asphalt are added thereto. The mixture is stirred until the additives dissolve in the wax. Next 60 parts commercial crystal urea are added to the wax phase with stirring. The urea has a particle size of larger than 100 mesh. In order to obtain a more uniform dispersion the urea is subdivided to smaller than 200 mesh by passing the entire urea-wax phase mixture through a roller mill having a roller clearance such that any solid passing therethrough is smaller than 200 mesh. During the milling operation the wax phase cools and solidifies and the discharge from the mill is a dry powdery solid. The solid is reheated to 200° F. whereupon the wax melts and a fluid dispersion is again obtained.

The fluid dispersion is then formed into a plurality of small particles by means of a mold and the resulting particles are allowed to cool to room temperature to effect solidification of the wax phase. The particles so prepared are then divided into two portions. The particles in one portion are immediately subjected to a water resistance test as follows. A quantity of particles equivalent to 5 grams of urea is submerged in 100 grams of water at 77° F. without agitation. After 200 hours submergence the water is analyzed for urea content. Knowing the amount of urea (5 gms.) in the original sample and the amount of urea dissolved in the water the percentage of urea which is leached out of the particles can be calculated. The amount of urea leached out is 16%.

The other portion of particles is placed in a closed container (not air tight) and the container is placed on a shelf for 4 weeks. At the end of the 4-week storage period the particles are subjected to the water resistance test described above. The amount of urea leached out is 45%. This shows that a slow release fertilizer comprising solid urea dispersed in solid low melt point paraffin wax is not a storage stable product.

*Example XV*

The procedure is the same as in Example XIV except that the 36 parts of wax used are a mixture of 27 parts of the wax used in Example I and 9 parts of a paraffin wax having a melting point of 155° F., a penetration at 77° F. of 9 dmm., and a viscosity at 210° F. of 44.8 S.U.S. This latter wax is a high melt point paraffin wax as defined herein. Thus the wax mixture is 75% low melt point paraffin wax and 25% high melt point paraffin wax. The two waxes are both charged to the mixing vessel and heated to 240° F. with stirring before adding the rosin and asphalt.

The result of the 200 hour water resistance test on the particles prepared in this example is as follows: in the test immediately after preparation of the particles 24% of the urea is leached out. After 4 weeks storage the amount of urea leached out is 28%. This shows that the inclusion of high melt point paraffin wax in the composition results in a substantially storage stable product.

*Example XVI*

The procedure is the same as in Example XV except that instead of using 9 parts of high melt point paraffin wax 9 parts of microcrystalline wax are used. The microcrystalline wax has a melting point of 193° F., a penetration at 77° F. of 5 dmm., and a viscosity at 210° F. of 84 S.U.S. Thus the wax mixture is 75% low melt point paraffin wax and 25% microcrystalline wax.

The result of the 200 hour water resistance test is as follows. In the test immediately after preparation of the particles 27% of the urea is leached out. After 4 weeks storage 30% of the urea is leached out. This shows that the inclusion of the microcrystalline wax in the composition has resulted in a substantially storage stable product.

It will be apparent from the three preceding examples that the wax blends used in Examples XV and XVI result in an initial water resistance, i.e., water resistance at the time of preparation, that is lower than that obtained when a low melt paraffin wax is used alone as in Example XIV. This is due to the fact that low melt point paraffin wax inherently is more water resistant than microcrystalline wax or higher melt point paraffin waxes. Any disadvantage resulting from this higher initial water resistance is generally offset by two factors. After storage for 4 weeks, which is not uncommon in normal commercial operation, the water resistance of the composition containing only low melt point paraffin wax is actually lower than when the wax mixtures are used. Secondly, when the wax mixtures are used there is substantially no change in water resistance during storage, the import of which is that every ultimate consumer of the fertilizer product will receive a product having the same water resistance.

Substantially the same storage stability as shown by Examples XV–XVI is obtained when other microcrystalline waxes or other high melt point paraffin waxes are incorporated into the low melt point paraffin wax.

The invention claimed is:

1. Method of forming a stable dispersion of solid urea in molten paraffin wax from which dispersion a slow release fertilizer can be prepared, said dispersion being stable in that the urea and paraffin wax components thereof do not react to form an adduct, which comprises mixing solid urea, molten paraffin wax, and a stabilizing amount in the range of 0.1–100% by weight of said paraffin wax, of molten microcrystalline wax.

2. Method according to claim 1 wherein the amount of urea is 5–80 parts and the total amount of paraffin wax and microcrystalline wax is 15–49 parts.

3. Method according to claim 1 wherein the microcrystalline wax has a melting point in the range of 160°–210° F. and a penetration at 77° F. in the range of 5–15 dmm.

4. In a process in which solid urea is dispersed in a molten paraffin wax which normally reacts with said solid urea to form an adduct and the resulting mixture is subsequently cooled to below the melting point of said wax whereby a solid slow release fertilizer is obtained the improvement for inhibiting reaction between said solid urea and said molten paraffin wax to form an adduct which comprises dissolving microcrystalline wax in said molten paraffin wax, the amount of said microcrystalline wax being at least 0.1% by weight of said paraffin wax.

5. A process according to claim 4 wherein the amount of microcrystalline wax is at least 3%.

6. A particulate slow release urea-wax fertilizer of improved storage stability which comprises a dispersion of solid urea in solid wax, substantially all the particles of said solid urea being surrounded by and encased in said solid wax, said solid wax being a substantially homogeneous mixture of (I) a paraffin wax having a melting point in the range of 110° to 140° F. and (II) a wax selected from the group consisting of (a) microcrystalline wax, and (b) paraffin wax having a melting point of at least 145° F., the amount of Wax II being 10–50% of the total amount of Wax I and Wax II.

7. Composition according to claim 6 wherein the amount of said solid urea is 5–80 parts and the total amount of said solid wax is 15–49 parts.

8. Composition according to claim 6 wherein Wax II is microcrystalline wax.

9. Composition according to claim 6 wherein Wax II is paraffin wax.

10. Composition according to claim 6 wherein Wax I has a melting point in the range of 120° to 135° F., wherein Wax II(a) has a melting point in the range of 160° to 210° F., and wherein Wax II(b) has a melting point in the range of 150° to 165° F.

References Cited by the Examiner
UNITED STATES PATENTS

| | | | |
|---|---|---|---|
| 2,936,226 | 5/1960 | Kaufmann | 71—64 |
| 3,192,030 | 6/1965 | Mills | 71—64 |

S. LEON BASHORE, *Acting Primary Examiner.*

T. D. KILEY, *Assistant Examiner.*